United States Patent
Kim et al.

(10) Patent No.: US 11,588,975 B2
(45) Date of Patent: Feb. 21, 2023

(54) METHOD OF MAPPING MONITORING POINT IN CCTV VIDEO FOR VIDEO SURVEILLANCE SYSTEM

(71) Applicants: Tae Woo Kim, Seoul (KR); Sungjin Lee, Gwangmyeong-si (KR)

(72) Inventors: Tae Woo Kim, Seoul (KR); Sungjin Lee, Gwangmyeong-si (KR)

(73) Assignee: INNODEP CO., LTD., Seoul (KR)

( * ) Notice: Subject to any disclaimer, the term of this patent is extended or adjusted under 35 U.S.C. 154(b) by 0 days.

(21) Appl. No.: 17/497,113

(22) Filed: Oct. 8, 2021

(65) Prior Publication Data

US 2022/0256089 A1      Aug. 11, 2022

(30) Foreign Application Priority Data

Oct. 16, 2020  (KR) .................. 10-2020-0133900
Nov. 13, 2020  (KR) .................. 10-2020-0151421

(51) Int. Cl.
*H04N 5/232*      (2006.01)
*G06T 7/73*       (2017.01)
*G06V 20/52*      (2022.01)

(52) U.S. Cl.
CPC .......... *H04N 5/23299* (2018.08); *G06T 7/73* (2017.01); *G06V 20/52* (2022.01); *H04N 5/23296* (2013.01)

(58) Field of Classification Search
CPC .. H04N 5/23299; H04N 5/23296; G06T 7/73; G06T 2207/30232; G06T 2207/30241; G06V 20/52; G06V 10/255; G08B 13/19608

See application file for complete search history.

(56) References Cited

U.S. PATENT DOCUMENTS

| | | | |
|---|---|---|---|
| 9,194,954 B2* | 11/2015 | Simon | G06T 7/33 |
| 10,380,469 B2* | 8/2019 | Troy | G06F 3/147 |
| 2005/0225634 A1* | 10/2005 | Brunetti | G08B 13/19689 |
| | | | 348/E7.086 |
| 2008/0031493 A1* | 2/2008 | Brogren | G06V 10/56 |
| | | | 382/103 |
| 2009/0087029 A1* | 4/2009 | Coleman | G06V 10/255 |
| | | | 382/103 |
| 2010/0045701 A1* | 2/2010 | Scott | G06T 7/80 |
| | | | 348/135 |
| 2012/0133773 A1* | 5/2012 | Brogren | G06V 10/758 |
| | | | 348/E7.085 |

(Continued)

*Primary Examiner* — Chiawei Chen
(74) *Attorney, Agent, or Firm* — John K. Park; Park Law Firm

(57) ABSTRACT

The present invention generally relates to a technology of accurately mapping a specific point in CCTV video onto the corresponding point on a map. More specifically, the present invention relates to a technology of mapping a specific point in CCTV video onto the corresponding point on a map through coordinate transformation between pixel coordinate of canvas plane of the CCTV camera and global coordinate of physical space for the video surveillance system. The present invention may provide an advantage of improving the efficiency of video surveillance system. When an urgent situation is found in CCTV video, the location in which the urgent situation is occurring may be accurately specified, which renders an effective action possible.

14 Claims, 10 Drawing Sheets

(56) References Cited

U.S. PATENT DOCUMENTS

| | | | | |
|---|---|---|---|---|
| 2012/0257792 | A1* | 10/2012 | Simon | G06T 7/33 |
| | | | | 382/103 |
| 2016/0012280 | A1* | 1/2016 | Ito | G06V 40/173 |
| | | | | 382/305 |
| 2020/0320720 | A1* | 10/2020 | Baig | G06T 7/73 |
| 2021/0014458 | A1* | 1/2021 | Rajamanickam | |
| | | | | H04N 21/23418 |

* cited by examiner (a) CCTV Video  (b) Surveillance Area Map (a) Target Point (TP') Identification    (b) Start Point (SP') Identification

| | GPS Coordinate | Pixel Coordinate |
|---|---|---|
| Camera | (35.6927486, 128.4727980) | (960, 540) |
| CCTV Watching Area | (35.6869816, 128.4721728)<br>(35.6898539, 128.4668278)<br>(35.6926024, 128.4724252)<br>(35.6924127, 128.4727983) | (0, 0)<br>(1920, 0)<br>(1920, 1280)<br>(0, 1080) |
| Soccer Field Area | (35.6919594, 128.4724209)<br>(35.6919594, 128.4722021)<br>(35.6922644, 128.4721942)<br>(35.6922698, 128.4724259) | (623, 377)<br>(941, 334)<br>(1367, 475)<br>(964, 568) | mapping

METHOD OF MAPPING MONITORING POINT IN CCTV VIDEO FOR VIDEO SURVEILLANCE SYSTEM

BACKGROUND OF THE INVENTION

The present invention generally relates to a technology of accurately mapping a specific point in CCTV video onto the corresponding point on a map.

More specifically, the present invention relates to a technology of mapping a specific point in CCTV video onto the corresponding point on a map through coordinate transformation between pixel coordinate of canvas plane of the CCTV camera and global coordinate of physical space for the video surveillance system.

In recent years, the video surveillance system is widely used in many fields. The police system or the national defense surveillance system actively adopts the video surveillance technology. For example, in case of the national defense surveillance system, in order to cope with the military power reduction problem according to the decrease of population, the video surveillance system based on CCTV cameras is used in the national border defense.

The GIS (Geographic Information System) technology may cooperate with video surveillance system in order to improve the efficiency of video surveillance. In this case, the location of camera is marked on a map. Because the camera does not have a geomagnetic sensor, it cannot know for itself which direction it is pointing in. In conventional GIS solutions, only the location of camera is marked on a map.

However, in the video surveillance system, the area covered by a CCTV camera is generally very large. When an urgent situation occurs, it is difficult to effectively respond if only knowing the location of the camera which is viewing the urgent situation.

SUMMARY OF THE INVENTION

In general, it is an object of the present invention to provide a technology of accurately mapping a specific point in CCTV video onto the corresponding point on a map.

More specifically, it is another object of the present invention to provide a technology of mapping a specific point in CCTV video onto the corresponding point on a map through coordinate transformation between pixel coordinate of canvas plane of the CCTV camera and global coordinate of physical space for the video surveillance system.

In order to achieve the objects as above, the present invention discloses a method of mapping a specific point in CCTV video onto a map in video surveillance system.

The mapping method of CCTV video in video surveillance system of the present invention comprises a first step of initializing the orientation information of CCTV camera (100) with reference to a feature point whose GIS information is obtainable, wherein the initialization is performed by matching the GIS information (FP) of the feature point and the pixel coordinate of the center of the CCTV video (hereinafter referred to as 'fiducial center pixel coordinate') (FP') by PTZ control of the CCTV camera (100) and then storing the combination of the GIS information (FP) and the fiducial center pixel coordinate (FP'); a second step of identifying a target (TP') in the CCTV video and obtaining the pixel coordinate of the target (hereinafter referred to as 'target pixel coordinate (TP')'); a third step of identifying a starting point (SP, SP') in the map as well as in the CCTV video in connection with the CCTV video in which the target (TP') is identified, wherein the starting point (SP, SP') is identified by use of the orientation information of the CCTV camera (100); and a fourth step of obtaining the GIS information (TP) in the map of the target by estimating the displacement in the map from the starting point (SP) to the target (TP) which is corresponding to the displacement in the CCTV video from the starting point (SP) to the target (TV), with taking the reference by the pixel coordinate (SP) and the GIS information (SP) of the starting point.

The computer program according to the present invention is stored in a medium in order to execute the mapping method of CCTV video in video surveillance system which has been set forth above by being combined with hardware.

DESCRIPTION OF SPECIFIC EMBODIMENTS

Hereinafter, the present invention will be described in detail with reference to the drawings.

Figure 1:
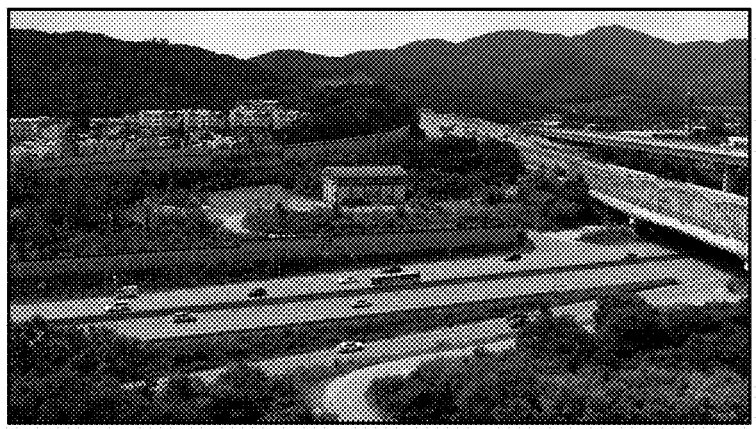
FIG. 1 shows an example of CCTV video.

FIG. 1 shows an example of CCTV video. Referring to FIG. 1, the drawback of utilizing CCTV video is described below. Because a CCTV camera is installed at the top of a pole of tens of meters high with looking down to the surface, CCTV video is formed as in FIG. 1. The video surveillance system is provided with this form of CCTV video. If a security staff designates a target on the monitoring screen, a video analysis server which is cooperating with the video surveillance system finds out the pixel coordinate in CCTV video (i.e., the pixel location in an image frame of the CCTV video) of the target in the present invention.

The video surveillance system generally has the location information of the CCTV cameras, it is able to accurately mark on a map the location of the CCTV camera which is viewing the target. However, the video surveillance system is unable to indicate which direction the CCTV camera is pointing in. Further, the video surveillance system is unable to accurately mark on the map the location of the CCTV video. Depending on the installation condition of the CCTV camera, its initial geomagnetic direction can be variously determined. However, because the CCTV camera does not have a geomagnetic sensor, it cannot know for itself which direction it is pointing in. Therefore, in the video surveillance system, it is very difficult to accurately find out where a specific point in CCTV video corresponds to in the physical space and then to mark the location on a map.

Figure 2:
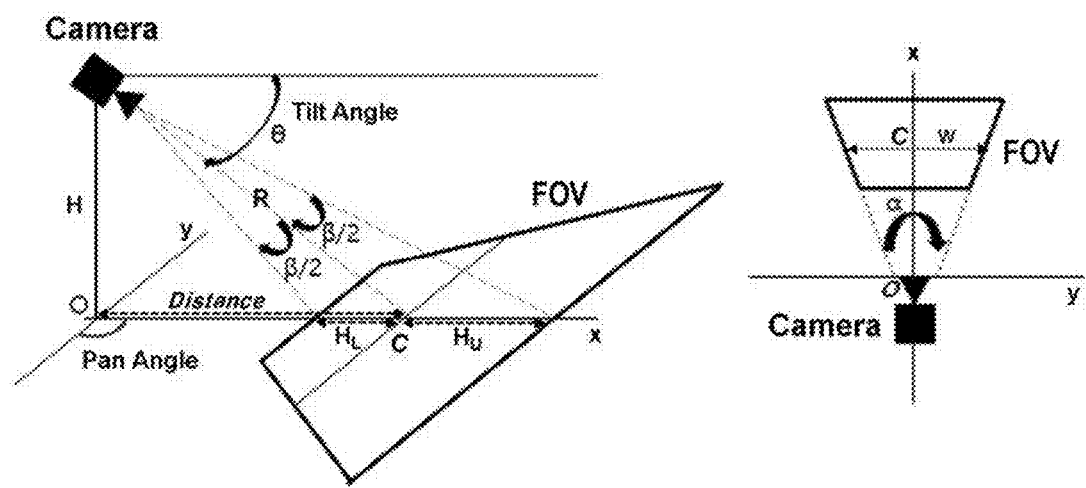
FIG. 2 is a diagram showing geometric relation between camera parameters and surveillance area in CCTV video.
Figure 3:
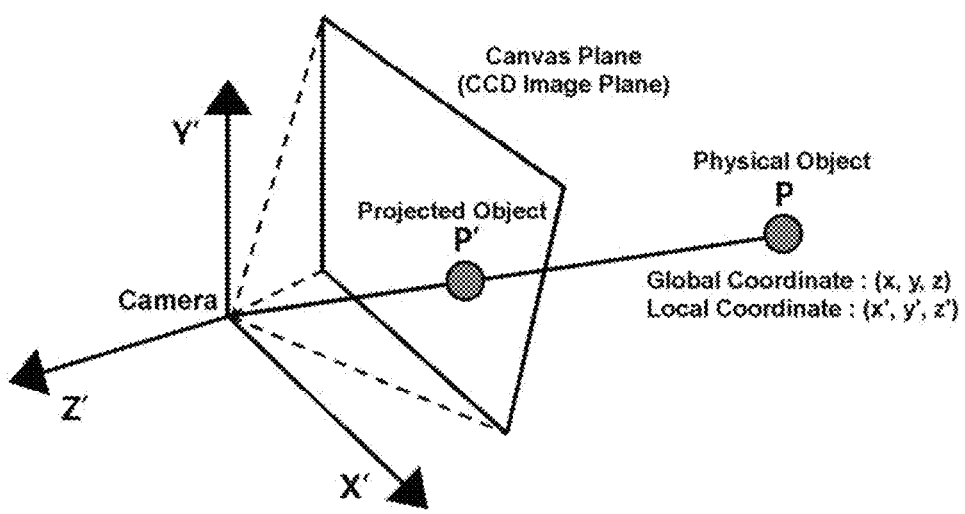
FIG. 3 is a diagram showing a Canvas plane and an object projection of a CCTV camera.
Figure 4:
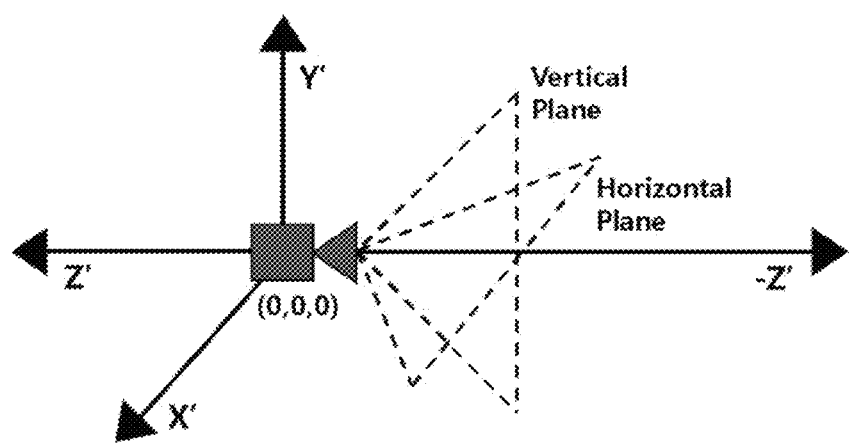
FIG. 4 is a diagram showing a local coordinate system of a CCTV camera.

Referring to FIGS. 2 to 4, it is described the coordinate transformation of camera which may be preferably utilized in the present invention.

FIG. 2 is a diagram showing geometric relation between camera parameters and surveillance area in CCTV video. The physical space is 3-dimensional physical space, whereas the CCTV video is 2-dimensional plane. Therefore, the process of producing CCTV video by the CCTV camera is transforming 3-dimensional physical space into 2-dimensional plane. In the process, the CCTV video is affected by the geometric photographing environment (the geometry information of the CCTV camera) in which the CCTV camera is placed in 3-dimensional physical space. Additionally, the CCTV video is also affected by the optical properties of the CCTV camera.

The factors which affect the CCTV video are collectively referred to as 'camera parameters', which are generally divided into extrinsic parameters and intrinsic parameters. The extrinsic parameters may include geographic location (latitude, longitude), pole height (H), and steering angle (tilt angle, pan angle) of the camera. The intrinsic parameters may include image resolution, vertical FOV (Field of View), horizontal FOV, focal length (f), and current PTZ control values (Pan, Tilt, Zoom).

Figure 5:
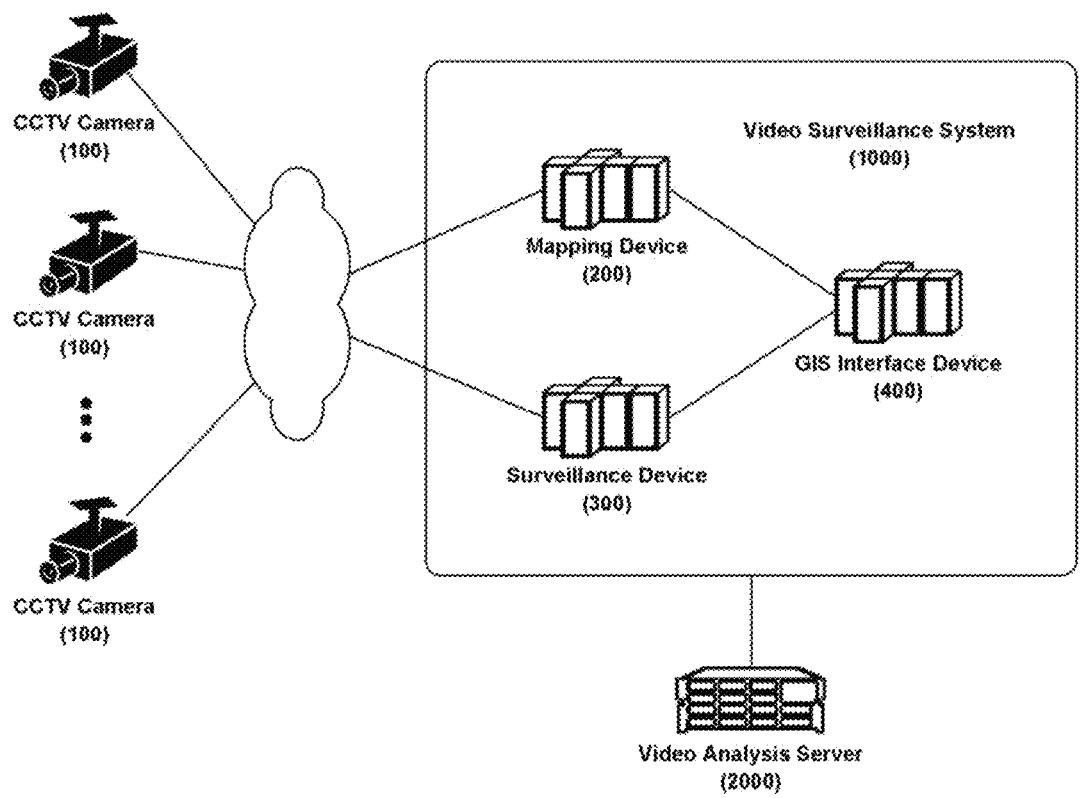
FIG. 5 is a diagram showing a system configuration for processing the mapping method of CCTV video of the present invention.

It assumes that the device which performs the mapping process of CCTV video of the present invention (e.g., the mapping device (200) in FIG. 5) may obtain all or at least a part of these camera parameters in advance or may obtain them in real-time basis from the CCTV camera. For example, the device may obtain the current PTZ control values from the CCTV camera.

FIG. 3 is a diagram showing a Canvas plane and a projection (P') of a CCTV camera.

In FIG. 3, the subject (P) is a physical object which really exists in 3-dimensional physical space. The projection (P') is the projected object which is formed by projecting the subject (P) of 3-dimensional physical space onto the 2-dimensional Canvas plane as the CCTV camera shoots the subject (P). The light from the subject (P) reaches an image pickup part (e.g., CCD) of the camera so as to form a projection (P'). The plane in which the projection (P') is formed is referred to as a Canvas plane.

In this specification, two types of coordinate system are defined in order to mathematically handle the CCTV video. The first is 'the local coordinate system'. In the local coordinate system, the coordinate space is defined with respect to each of CCTV cameras. Therefore, the coordinate space is affected by the current state of the CCTV camera (e.g., PTZ state). In general, the local coordinate system is defined as shown in FIG. 4. Referring to FIG. 4, the horizontal right direction of the CCTV camera is defined as +x direction, and the vertical upward direction of the CCTV camera is defined as +y direction. Further, the front direction of the CCTV camera among the perpendicular directions of the xy plane is defined as −z direction. In this specification, the local coordinate is represented by (x', y', z').

The second is 'the global coordinate system'. In the global coordinate system, the coordinate space is commonly defined for all objects. In this specification, the global coordinate is represented by (x, y, z).

Therefore, in 3-dimensional physical space, the location of the subject (P) may be represented by the global coordinate system or the local coordinate system. The coordinate representation of the location of the subject (P) by the global coordinate system is (x, y, z), whereas the coordinate representation of the location of the subject (P) by the local coordinate system is (x', y', z'). The former is referred to as global coordinate, whereas the latter is referred to as local coordinate.

In FIG. 3, the coordinate transformation between the global coordinate (x, y, z) and the local coordinate (x', y', z') for a subject (P) may be represented by [Equation 1] and [Equation 2]. In these equations, the matrix M is the projection matrix using the direction vector of the local coordinate system. Three values (c00~c02) in the first row of the projection matrix M are the representation in the global coordinate system of the x-direction unit vector of the local coordinate system. Three values (c10~c12) in the second row of the projection matrix M are the representation in the global coordinate system of the y-direction unit vector of the local coordinate system. Three values (c20~c22) in the third row of the projection matrix M are the representation in the global coordinate system of the z-direction unit vector of the local coordinate system. Three values (c30~c32) in the fourth row of the projection matrix M are the global coordinate of the CCTV camera.

$$M = [c_{00}, c_{01}, c_{02}, 0; c_{10}, c_{11}, c_{12}, 0; c_{20}, c_{21}, c_{22}, 0; c_{30}, c_{31}, c_{32}, 1] \quad \text{[Equation 1]}$$

$$(x', y', z', 1) = (x, y, z, 1) \times M^{-1} \quad \text{[Equation 2]}$$

Next, when a subject (P) is photographed by a CCTV camera, the position of the projection (P') in the CCTV video will be described. The coordinate transformation from the local coordinate (x', y', z') of the subject (P) into the pixel coordinate (P'raster.x', P'raster.y') of the projection (P') in the Canvas plane may be represented by [Equation 3] to [Equation 6]. In these equations, the Canvas Width and the Canvas Height are width and height of the area which is corresponding to the CCTV video, respectively. The FOV_H and FOV_V are Horizontal FOV and Vertical FOV of the CCTV camera, respectively.

$$\text{Canvas Width} = 2 * \text{Tan}\left(\frac{FOV_H}{2}\right) \quad \text{[Equation 3]}$$

$$\text{Canvas Height} = 2 * \text{Tan}\left(\frac{FOV_V}{2}\right)$$

$$P' \cdot x = \frac{x'}{z'}, \quad \text{[Equation 4]}$$

$$P' \cdot y = \frac{y'}{-z'}$$

$$P'_{normalized} \cdot x = \frac{P' \cdot x + \text{Canvas Width}/2}{\text{Canvas Width}} \quad \text{[Equation 5]}$$

$$P'_{normalized} \cdot y = \frac{P' \cdot y + \text{Canvas Height}/2}{\text{Canvas Height}}$$

$$P'_{raster} \cdot x = P'_{normalized} \cdot x \times \text{Display width} \quad \text{[Equation 6]}$$

$$P'_{raster} \cdot y = P'_{normalized} \cdot y \times \text{Display Height}$$

In summary, the local coordinate (x', y', z') can be obtained from the global coordinate (x, y, z) of the subject (P) by the coordinate transformation of [Equation 1] and [Equation 2]. Then, the pixel coordinate (P'raster.x', P'raster.y') of the projection (P') on the Canvas plane can be obtained from the local coordinate (x', y', z') by the coordinate transformation of [Equation 3] to [Equation 6]. The coordinate transformation formulas of [Equation 1] to [Equation 6] are determined by the camera parameters. As described above, it assumes that the camera parameters may be obtained in advance or in real-time basis.

The result as shown above is applied to FIG. 1. when the 3-dimensional global coordinate of the target is given with knowing the global coordinate of the CCTV camera, the 2-dimensional pixel coordinate in the CCTV video of the target is able to be obtained by [Equation 1] to [Equation 6]. However, the object of the present invention is the opposite process of the above. That is, when the 2-dimensional pixel coordinate in the CCTV video of a point is given with knowing the global coordinate of the CCTV camera, the 3-dimensional global coordinate of the point should be obtained in the present invention.

Figure 6:
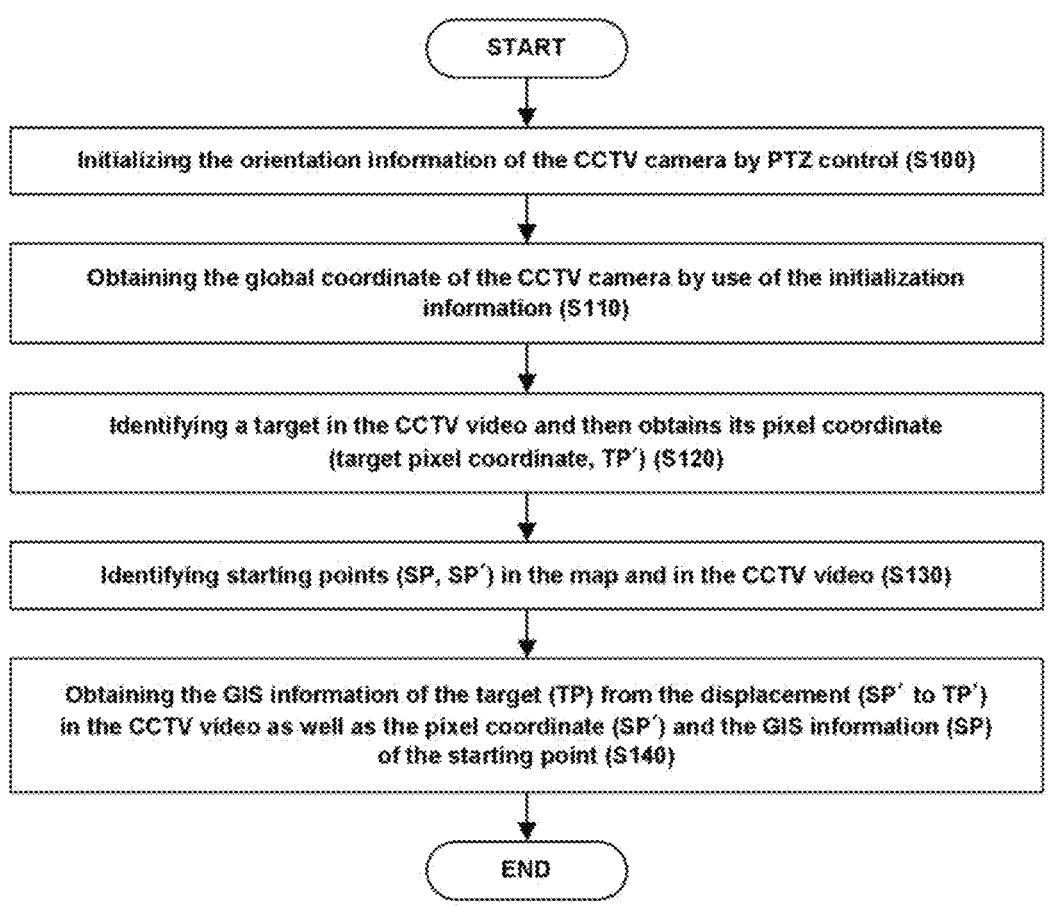
FIG. 6 is a flowchart showing the mapping method of CCTV video according to the present invention.

FIG. 5 is a diagram showing a system configuration for processing the mapping method of CCTV video of the present invention. FIG. 6 is a flowchart showing the mapping method of CCTV video according to the present invention.

Referring to FIG. 5, the mapping process of CCTV video of the present invention may be performed by cooperation of CCTV cameras (100), mapping device (200), surveillance device (300), and GIS interface device (400). The mapping device (200), the surveillance device (300), and the GIS interface device (400) may be implemented as separate devices. Alternatively, some of these devices may be implemented in one body, or may be implemented in the outside of the video surveillance system (1000), e.g., in the video analysis server (2000).

The CCTV cameras (100) are installed dispersively in many locations for video surveillance. Each of the CCTV cameras (100) creates video of its surroundings, and then provides the video to the mapping device (200) and surveillance device (300). It is preferable that the CCTV camera (100) has edge analysis function. Then, the CCTV camera (100) may perform a basic image analysis on the CCTV video, such as recognition of moving humans or cars, and then provide the information which has been obtained by the basic image analysis to the mapping device (200) and surveillance device (300).

The mapping device (200) performs the mapping process of CCTV video of the present invention. The mapping device (200) is provided with basic information which is required for the mapping process from the surveillance device (300).

The surveillance device (300) manages overall operation of the video surveillance system (1000). For example, the surveillance device (300) provides CCTV video from the CCTV cameras (100) to security staffs so that they may monitor the CCTV video in real-time basis, and then stores the CCTV video in storage devices for possible image search. Moreover, the surveillance device (300) delivers the CCTV video to the video analysis server (2000) so that the video analysis server (2000) may perform video analysis on the CCTV video. In the present invention, the surveillance device (300) provides the mapping device (200) with the basic information, e.g., the location information (latitude, longitude) of each of the CCTV cameras (100). Moreover, the surveillance device (300) may operate the CCTV cameras (100), e.g., PTZ control, for initializing the orientation information of each of the CCTV cameras (100). Moreover, the surveillance device (300) may cooperate with the mapping device (200) so as to let the domain of the CCTV video on a map. Further, if a suspicious object is found during the monitoring, the surveillance device (300) specifies a target by the suspicious object and then marks the location of the target on a map.

The GIS interface device (400) enables the mapping device (200) and the surveillance device (300) to access a geographic information database.

The video analysis server (2000) cooperates with the video surveillance system (1000) so as to perform video analysis on the CCTV video. For example, the video analysis server (2000) analyzes the CCTV video so as to check special things (e.g., the presence of objects or suspicious situation) and then provides the result to the video surveillance system (1000). Moreover, if a point is specified in the CCTV video, the video analysis server (2000) analyzes the CCTV video so as to find out its pixel coordinate and then provide it to the video surveillance system (1000).

Hereinafter, the mapping method of CCTV video according to the present invention shall be described in detail with reference to FIG. 6.

Step (S100): The mapping device (200) initializes the orientation information of the CCTV camera (100). It is preferable that the surveillance device (300) performs PTZ control on the CCTV camera (100) in response to the operation of security staffs, and the mapping device (200) completes the initialization by collecting various information in this PTZ control.

Figure 7:
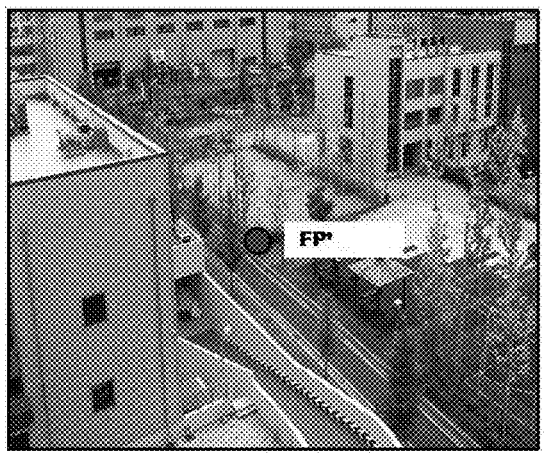
FIG. 7 is a diagram showing an example of initializing the orientation information of a CCTV camera by use of a feature point in the present invention.
Figure 7:
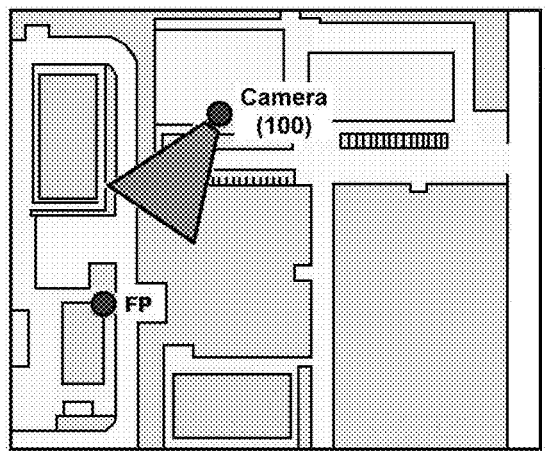

FIG. 7 is a diagram showing an example of initializing the orientation information of a CCTV camera by use of a feature point (FP) in the present invention. It assumes that the mapping device (200) has already had the GIS information (latitude, longitude) of the CCTV camera (100). The security staff selects a feature point in a map (e.g., an endpoint of a building, an edge of a tennis court, etc.) which is corresponding to the CCTV camera (100), and then performs PTZ control on the CCTV camera (100) so that the feature point may be positioned in the center of the CCTV video. In FIG. 7, the feature point in the map is represented as FP, whereas the corresponding feature point in the CCTV video is represented as FP'. Then, the mapping device (200) stores the PTZ control values in this state. Further, the mapping device (200) stores the combination of the GIS information of the feature point and the pixel coordinate of the center of the CCTV video (i.e., the fiducial center pixel coordinate). Because the feature point is selected in the map, the GIS information of the feature point may be obtained from map data of the map. The GIS information of the feature point is combined with the pixel coordinate of the center of the CCTV video with assuming that the feature point is in the center of the CCTV video.

In summary, through the initialization of the orientation information of the CCTV camera, the mapping device (200) has obtained the PTZ control values when a feature point (its GIS information is known) is positioned in the center of the CCTV video (the Canvas plane). Further, in this state, the mapping device (200) stores the combination of the pixel coordinate, GIS information (latitude, longitude) and PTZ control values.

In a map, each point is managed by GIS information (latitude, longitude). However, the global coordinate of a specific point may be necessary. For example, in the coordinate transformation of [Equation 1], the global coordinate of a specific point in the map is required. It can be achieved by a projection to transform GIS information (latitude, longitude) into global coordinate (e.g., the World Coordinates of the Google map). Conventionally, there are provided various kinds of projections. For example, the global coordinate may be obtained if the Mercator projection is applied to GIS information (latitude, longitude).

Step (S110): The 3-dimensional global coordinate of the CCTV camera (100) is obtained. As described above, the mapping device (200) has already have the GIS information (latitude, longitude) of the CCTV camera (100). Therefore, mapping device (200) is required to obtain the pole height (H) which is the last unknown information for the global coordinate of the CCTV camera (100). In case that the pole height (H) of the CCTV camera (100) is provided in advance, the step (S110) may be omitted.

The pole height (H) may be obtained by applying the tilt angle of the CCTV camera (100) into [Equation 7]. The tilt angle of the CCTV camera (100) has been obtained in (S100). In [Equation 7], the Distance value corresponds to the physical distance between the location in the surface of the Earth of the CCTV camera (100) and the location of the feature point, as shown in FIG. 2. The Distance value may be obtained from map data.

$$H = \text{Distance} \times \tan(\angle Tilt) \qquad [\text{Equation 7}]$$

By combining the GIS information (latitude, longitude) and the pole height (H) of the CCTV camera (100), the global coordinate (3D) of the CCTV camera (100) has been obtained. In other words, the geometry information of the CCTV camera (100) has been obtained.

Therefore, as described above with reference to FIG. 3, if the location (i.e., global coordinate) of the target is specified, the pixel coordinate in the CCTV video of the target may be obtained by [Equation 1] to [Equation 6]. Regarding the global coordinate of the target, the height of the target may be pre-obtained or provided from a separate system (not shown). Alternatively, the height of the target may be set to 0. The pixel coordinate in the CCTV video of the target can be obtained from the GIS information (latitude, longitude) of the target.

Step (S120): While operating video surveillance, the mapping device (200) identifies a target in the CCTV video in response, for example, to an operation of the security staffs by the surveillance device (300), to an abnormal detection signal (e.g., crime warning signal) of the video analysis server (2000), or to normal video analysis result. Then, the mapping device (200) obtains the pixel coordinate of the target, which is referred to as 'target pixel coordinate' for convenience.

Figure 8:
FIG. 8 is a diagram showing an example of identifying a target (TP) in the present invention.
Figure 8:
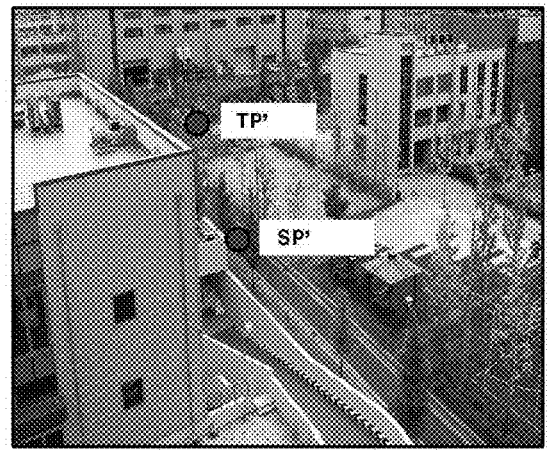

FIG. 8 (a) shows an example of identifying a target in the present invention. Referring to FIG. 8 (a), a security staff specifies a point as the target (TP') in the CCTV video, in which the target (TP') of FIG. 8 (a) is located around the feature point (FP') of FIG. 7 (a). In order to keep consistency in notation of the feature point (FP, FP'), in this specification, the target in the CCTV video is represented as TP', whereas the corresponding target in the map is represented as TP.

In (S120), the target (TP') is identified in the CCTV video. In the following process, the GIS information (latitude, longitude) which is corresponding to pixel coordinate of the target (i.e., target pixel coordinate) in order to mark the target (TP') on the map.

Step (S130): The mapping device (200) selects a starting point in the CCTV video in which the target (TP') is identified, and then identifies the coordinates (SP, SP') of the start point in the map and in the CCTV video, respectively. FIG. 8 (b) shows an example of identifying a starting point (SP') in the CCTV video in which the target (TP') is identified.

The starting point (SP, SP') may be roughly selected in the CCTV video in which the target (TP') is identified. The orientation information of the CCTV camera (100) which has been initialized in (S100) may be utilized in identifying the coordinates of the starting point. In (S100), there were stored the GIS information (FP) and the fiducial center pixel coordinate (FP') (i.e., the pixel coordinate of the center of the CCTV video) of the feature point. In (S100), there were also stored the PTZ control values of the CCTV camera (100) when the feature point (FP') is positioned in the center of the CCTV video. Further, in (S110), the geometry information of the CCTV camera (100) was obtained based on the stored information.

First, the mapping device (200) obtains the PTZ control values of the CCTV camera (100) when the target (TP') is identified in (S120). This PTZ control values (i.e., 'target PTZ values') are generally different from the PTZ control values (i.e., 'initial PTZ values') when the feature point (FP, FP') is selected in (S100). Comparing (S100) and (S120), the CCTV camera (100) is identical, but its PTZ values are different. Therefore, the starting point (SP, SP') is different from the feature point (FP, FP').

In the state of knowing the geometry information of the CCTV camera (100), the relation between the GIS information (SP) and the pixel coordinate (SP') for the starting point at the target PTZ value is able to be obtained from the relation between the GIS information (FP) and the fiducial center pixel coordinate (FP') for the feature point at the initial PTZ value. The simplest solution for this is setting the pixel coordinate (SP') of the starting point to be the same as the pixel coordinate (FP') of the feature point. If the pixel coordinate (SP') of the starting point is set to be the same as the pixel coordinate (FP') of the feature point, the GIS information (SP) of the starting point can be estimated based on the geometry information of the CCTV camera (100), the relation between the GIS information (FP) and the fiducial center pixel coordinate (FP'), the initial PTZ values, and the target PTZ values.

Step (S140): The mapping device (200) takes the reference by the pixel coordinate (SP') and the GIS information (SP) of the starting point which have been obtained in (S130), and then obtains the GIS information (TP) in the map of the target by estimating the displacement in the map from the starting point (SP) to the target (TP) which is corresponding to the displacement in the Canvas plane (CCTV video) from the starting point (SP') to the target (TV).

Figure 9:
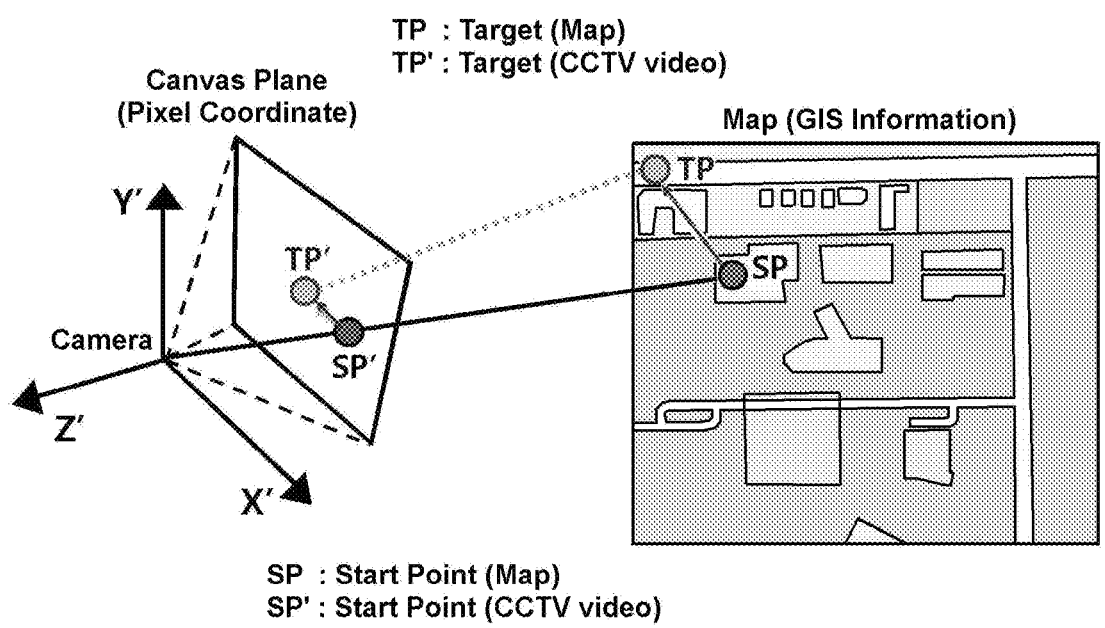
FIG. 9 is a diagram showing a process of obtaining the GIS information of the target (TP) from the starting point (SP, SP) in the present invention.

FIG. 9 is a diagram showing a process of obtaining the GIS information of the target (TP) from the starting point (SP, SP') in the present invention. The pixel coordinate (SP') and the GIS information (SP) of the starting point were obtained in (S130), and the pixel coordinate (TP') in the CCTV video of the target was identified in (S120). Then, in (S140), the GIS information (TP) in the map of the target is to be obtained.

As a basic premise for performing this process, it assumes that the partial differential coefficients of the pixel width (W) and the pixel height (H) on the Canvas plane with respect to latitude and longitude on the map are included in the map data or at least are able to be obtained from the map data.

Such an assumption is valid when considering the fact that topographic map as well as planimetric map is generally included in the map services.

The rate of change in the pixel width (W) and the pixel height (H) with respect to latitude and longitude at a specific point may be expressed as the partial differential matrix of [Equation 8], which is referred to herein as 'partial differential map matrix' for convenience. In general, terrains are uneven. Therefore, the partial differential map matrix varies depending on points in the map, that is, pixel locations in the Canvas plane.

$$\begin{pmatrix} \frac{\partial W}{\partial lat} & \frac{\partial W}{\partial lon} \\ \frac{\partial H}{\partial lat} & \frac{\partial H}{\partial lon} \end{pmatrix}$$ [Equation 8]

The mathematical relationship between displacements in the Canvas plane and in the map may be expressed as [Equation 9] and [Equation 10]. In these equations, ΔW_error and ΔH_error are horizontal and vertical pixel errors between the current position and the target (TP') in the Canvas plane, respectively. That is, in the Canvas plane, moving ΔW_error horizontally in addition to ΔH_error vertically from the current position may result in reaching the target (TP'). The Δlatitude (Δlat) and Δlongitude (Δlon) are the latitudinal and longitudinal displacements in the map corresponding to ΔW_error and ΔH_error movements in the Canvas plane, respectively.

First, [Equation 9] can be obtained from the definition of the partial differential map matrix.

$$\begin{pmatrix} \frac{\partial W}{\partial lat} & \frac{\partial W}{\partial lon} \\ \frac{\partial H}{\partial lat} & \frac{\partial H}{\partial lon} \end{pmatrix} \begin{pmatrix} \Delta lat \\ \Delta lon \end{pmatrix} = \begin{pmatrix} \Delta W_{error} \\ \Delta H_{error} \end{pmatrix}$$ [Equation 9]

where,

*lat*: latitude

*lon*: longitude

Then, [Equation 10] can be obtained if the inverse of the partial differential map matrix is applied to the both ends of [Equation 9].

$$\begin{pmatrix} \Delta lat \\ \Delta lon \end{pmatrix} = \begin{pmatrix} \frac{\partial W}{\partial lat} & \frac{\partial W}{\partial lon} \\ \frac{\partial H}{\partial lat} & \frac{\partial H}{\partial lon} \end{pmatrix}^{-1} \begin{pmatrix} \Delta W_{error} \\ \Delta H_{error} \end{pmatrix}$$ [Equation 10]

When a pixel point moves ΔW_error in the horizontal direction and ΔH_error in the vertical direction in the Canvas plane, the corresponding displacements of latitudinal and longitudinal directions in the map can be obtained from [Equation 10]. If ΔW_error or ΔH_error of big values (e.g., 100 pixels) are applied at a time, the error between the actual and the calculation output of [Equation 10] may increase, since terrains are uneven.

The first embodiment of (S140) is to iteratively move the pixel coordinate little by little from the starting point (SP, SP') towards the target pixel coordinate (TP') with obtaining the ΔGIS_displacement in the map by use of the partial differential map matrix. The mapping device (200) itera-tively performs this process until the current location in the Canvas plane reaches the target pixel coordinate (TP').

This process of the first embodiment of (S140) is described step by step. In order to move in the Canvas plane from the current location toward the target pixel coordinate (TP'), the partial differential map matrix, i.e., the rate of change in pixel coordinate with respect to the change in latitude and longitude at the GIS information of the current location, is obtained. Then, the displacement between the target pixel coordinate (TP') and the current pixel coordinate is applied in [Equation 10] so as to obtain Δlatitude and Δlongitude for reaching the target pixel coordinate (TP'). As described above, if the values of Δlatitude and Δlongitude which were obtained above are utilized at a time for estimating the GIS information of the target (TP), the error may be very big. It is preferable to iteratively perform the above process with moving little by little toward the target pixel coordinate (TP') in the Canvas plain. For example, 10% of displacement in the Canvas plain and the corresponding ΔGIS_displacement (Δlatitude, Δlongitude) in the map may be iteratively utilized. When the pixel coordinate reaches the target pixel coordinate (TP'), the GIS information (latitude, longitude) (TP) of the target may be obtained by totally reflecting the plurality of ΔGIS_displacement.

This process of the first embodiment of (S140) is described in other words. In the state of knowing the pixel coordinate (SP') and the GIS information (latitude, longitude) (SP) of the starting point, with moving the pixel location little by little in the Canvas plane from the starting point (SP) towards the target pixel coordinate (TV), the mapping device (200) iteratively performs the process of obtaining the partial differential map matrix at that location and then obtaining the ΔGIS_displacement (Δlatitude, Δlongitude) in the map by [Equation 10] corresponding to the pixel displacement (i.e., the current movement in the Canvas plane). When the pixel coordinate finally reaches the target pixel coordinate (TV), the mapping device (200) totally reflects the plurality of ΔGIS_displacement (Δlatitude, Δlongitude) which were obtained so far so as to obtain the GIS information (latitude, longitude) (TP) of the target.

The second embodiment of (S140) is to iteratively move the GIS information (latitude, longitude) little by little in the map from the starting point (SP, SP) by [Equation 9] with observing the corresponding change in the pixel coordinate (i.e., Δpixel_displacement) in the Canvas plane by [Equation 1] to [Equation 6] in order to find out the movement trajectory to the target pixel coordinate (TV). The mapping device (200) iteratively performs this process until the accumulation of the plurality of Δpixel_displacement reaches the target pixel coordinate (TV).

Figure 10:
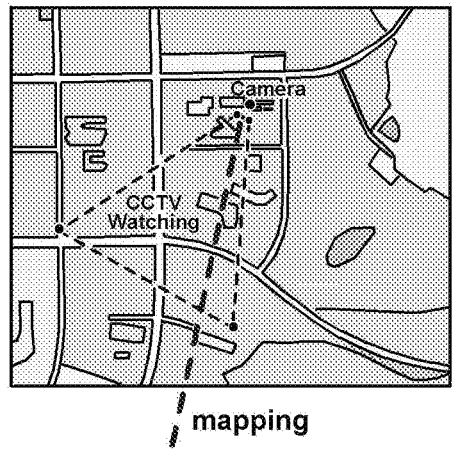
FIG. 10 is a diagram showing a test result of the mapping method of CCTV video of the present invention.
Figure 10:
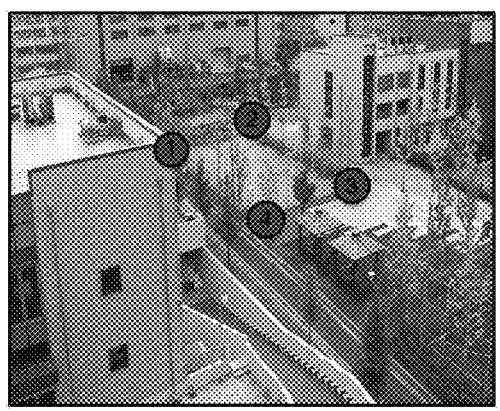
Figure 10:
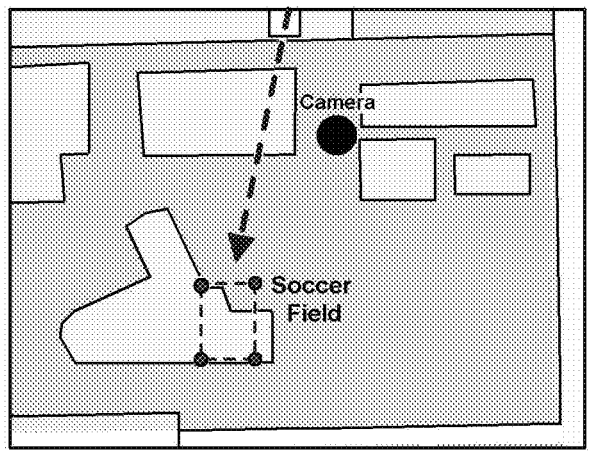

FIG. 10 is a diagram showing a test result of the mapping method of CCTV video of the present invention. The test site was Korea Conformity Laboratories (KCL) in Daegu of Republic of Korea, and a PTZ camera was installed on the roof of the KCL building. The camera parameters of this test can be summarized below: the pole height (H) was 47 m, the horizontal FOV (FOV_H) was 56.1 degree, the vertical FOV (FOV_V) was 33.4 degree, the tilt angle was 19 degree, and the image resolution was 1920*1080 (FHD).

Referring to FIG. 10, the GIS information (the GPS coordinate) of the camera was provided in advance as that of the KCL building in Daegu. Further, one corner (the location #4) of the soccer field was utilized as a feature point for initializing the orientation information of the camera (100). The mapping technology of the present invention was applied in this condition, by which the GIS information (latitude, longitude) was obtained for the watching area of the CCTV video as well as the pixel coordinates of the soccer field area. Then, the GIS information of the watching area and the soccer field area was marked on the map.

Referring to the test result, the watching area was calculated as trapezoidal shape and the soccer field area was calculated as rectangular shape, which is consistent with the actual shape of the watching area of the CCTV camera and the soccer field. Moreover, the geographic location of the soccer field actually coincided with the GIS information of the soccer field area which was obtained by the mapping process. Therefore, the usefulness of the mapping technology of CCTV video according to the present invention was substantially verified by the test result of FIG. 10.

The present invention may provide an advantage of improving the efficiency of video surveillance system. When an urgent situation is found in CCTV video, the location in which the urgent situation is occurring may be accurately specified, which renders an effective action possible. For example, when the enemy is detected by video analysis of the CCTV video in the national defense surveillance system, the location of the enemy may be accurately marked on a map, which renders prompt and effective actions possible.

Meanwhile, the present invention can be implemented in the form of a computer-readable code on a non-transitory computer-readable medium. Various types of storage devices exist as the non-transitory computer-readable medium, such as hard disks, SSDs, CD-ROMs, NAS, magnetic tapes, web disks, and cloud disks. The codes may be distributed, stored, and executed in multiple storage devices which are connected through a network. Further, the present invention may be implemented in the form of a computer program stored in a medium in order to execute a specific procedure by being combined with hardware.

What is claimed is:

1. A mapping method of CCTV video in video surveillance system, the method comprising:
    a first step of initializing the orientation information of CCTV camera (100) with reference to a feature point whose GIS information is obtainable, wherein the initialization is performed by matching a GIS information (FP) of the feature point and a pixel coordinate of the center of the CCTV video (hereinafter referred to as 'fiducial center pixel coordinate') (FP') by PTZ control of the CCTV camera (100) and then storing the combination of the GIS information (FP) and the fiducial center pixel coordinate (FP');
    a second step of identifying a target (TP') in the CCTV video and obtaining the pixel coordinate of the target (hereinafter referred to as 'target pixel coordinate (TP) ');
    a third step of identifying a starting point (SP, SP') in a map as well as in the CCTV video in connection with the CCTV video in which the target (TP') is identified, wherein the starting point (SP, SP') is identified by use of the orientation information of the CCTV camera (100); and
    a fourth step of obtaining the GIS information (TP) in the map of the target by estimating the displacement in the map from the starting point (SP) to the target (TP) which is corresponding to the displacement in the CCTV video from the starting point (SP') to the target (TP'), with taking the reference by the pixel coordinate (SP') and the GIS information (SP) of the starting point.

2. The method of claim 1, wherein, in the first step, PTZ control values for the feature point (FP, FP') are obtained and then stored, and wherein, in the first step, the orientation information of CCTV camera (100) includes geometry information of the CCTV camera (100) which includes the combination of a pole height (H) and the GIS information of the CCTV camera (100), wherein the pole height (H) is obtained by applying a tilt angle of the CCTV camera (100) for the feature point (FP, FP') into $$H = \text{Distance} \times \tan(\angle Tilt)$$

where the Distance value corresponds to the physical distance between the installation location of the CCTV camera (100) and the feature point.

3. The method of claim 2, wherein the third step comprises:
    a step of obtaining PTZ control values for the CCTV video in which the target (TP') is identified; and
    a step of selecting a starting point (SP, SP') in the map as well as in the CCTV video by use of the geometry information of the CCTV camera (100), the GIS information (FP) of the feature point, the fiducial center pixel coordinate (FP') of the feature point, the PTZ control values for the feature point, and the PTZ control values for the CCTV video in which the target (TP') is identified.

4. The method of claim 1, wherein the first step comprises:
    a step of identifying a selection input for a feature point in the map;
    a step of obtaining the GIS information of the feature point from map data of the map;
    a step of identifying PTZ control of the CCTV camera (100) with reference to the feature point;
    a step of storing the PTZ control values after the PTZ control; and
    a step of storing the combination of the GIS information of the feature point, the fiducial center pixel coordinate, and the feature point.

5. The method of claim 1, wherein the fourth step comprises:
    a step of iteratively moving a pixel coordinate little by little from the starting point (SP, SP') towards the target pixel coordinate (TP') in a Canvas plane of the CCTV video until the pixel coordinate reaches the target pixel coordinate (TP'), with obtaining Δdisplacement of GIS information (ΔGIS_displacement) in the map corresponding to a piecewise displacement of pixel coordinate by use of partial differential coefficients of pixel width and pixel height with respect to latitude and longitude, wherein the partial differential coefficients correspond to the location of the piecewise displacement in the Canvas plane, and then obtaining the GIS information (TP) of the target by totally reflecting the plurality of ΔGIS_displacement which are obtained in the iteration.

6. The method of claim 5, wherein the obtaining of ΔGIS_displacement corresponding to the Δdisplacement of pixel coordinate is performed by $$\begin{pmatrix} \Delta lat \\ \Delta lon \end{pmatrix} = \begin{pmatrix} \frac{\partial W}{\partial lat} & \frac{\partial W}{\partial lon} \\ \frac{\partial H}{\partial lat} & \frac{\partial H}{\partial lon} \end{pmatrix}^{-1} \begin{pmatrix} \Delta W_{error} \\ \Delta H_{error} \end{pmatrix}$$

where the partial differential matrix corresponds to a rate of change in a pixel width (W) and a pixel height (H) with respect to latitude and longitude of the GIS information, ΔW_error and ΔH_error correspond to horizontal and vertical pixel errors between the target and a current position, and Δlatitude (Δlat) and Δlongitude (Δlon) correspond to Δdisplacement of GIS information (ΔGIS_displacement) for reaching the target pixel coordinate (TP).

7. The method of claim 1, wherein the fourth step comprises:
a step of iteratively moving the GIS information little by little from the starting point (SP, SP') with obtaining Δdisplacement of a pixel coordinate (Δpixel_displacement) corresponding to a piecewise displacement of GIS information by use of partial differential coefficients of pixel width and pixel height with respect to latitude and longitude until an accumulation of the plurality of Δpixel displacement reaches the target pixel coordinate (TP'), and then obtaining the GIS information (TP) of the target by totally reflecting the Δdisplacement of GIS information (ΔGIS_displacement) which are obtained in the iteration.

8. A non-transitory computer program contained in a non-transitory storage medium comprising program code instructions which executes a mapping method of CCTV video in video surveillance system by a computer hardware device by use of branching by motion vector, the method comprising:
a first step of initializing the orientation information of CCTV camera (100) with reference to a feature point whose GIS information is obtainable, wherein the initialization is performed by matching a GIS information (FP) of the feature point and a pixel coordinate of the center of the CCTV video (hereinafter referred to as 'fiducial center pixel coordinate') (FP') by PTZ control of the CCTV camera (100) and then storing the combination of the GIS information (FP) and the fiducial center pixel coordinate (FP');
a second step of identifying a target (TP') in the CCTV video and obtaining the pixel coordinate of the target (hereinafter referred to as 'target pixel coordinate (TP) ');
a third step of identifying a starting point (SP, SP') in a map as well as in the CCTV video in connection with the CCTV video in which the target (TP') is identified, wherein the starting point (SP, SP') is identified by use of the orientation information of the CCTV camera (100); and
a fourth step of obtaining the GIS information (TP) in the map of the target by estimating the displacement in the map from the starting point (SP) to the target (TP) which is corresponding to the displacement in the CCTV video from the starting point (SP') to the target (TP'), with taking the reference by the pixel coordinate (SP') and the GIS information (SP) of the starting point.

9. The non-transitory computer program of claim 8, wherein, in the first step, PTZ control values for the feature point (FP, FP') are obtained and then stored, and
wherein, in the first step, the orientation information of CCTV camera (100) includes geometry information of the CCTV camera (100) which includes the combination of a pole height (H) and the GIS information of the CCTV camera (100), and wherein the pole height (H) is obtained by applying a tilt angle of the CCTV camera (100) for the feature point (FP, FP') into $$H = \text{Distance} \times \tan(\angle Tilt)$$

where the Distance value corresponds to the physical distance between the installation location of the CCTV camera (100) and the feature point.

10. The non-transitory computer program of claim 9, wherein the third step comprises:
a step of obtaining PTZ control values for the CCTV video in which the target (TP') is identified; and
a step of selecting a starting point (SP, SP') in the map as well as in the CCTV video by use of the geometry information of the CCTV camera (100), the GIS information (FP) of the feature point, the fiducial center pixel coordinate (FP') of the feature point, the PTZ control values for the feature point, and the PTZ control values for the CCTV video in which the target (TP') is identified.

11. The non-transitory computer program of claim 8, wherein the first step comprises:
a step of identifying a selection input for a feature point in the map;
a step of obtaining the GIS information of the feature point from map data of the map;
a step of identifying PTZ control of the CCTV camera (100) with reference to the feature point;
a step of storing the PTZ control values after the PTZ control; and
a step of storing the combination of the GIS information of the feature point, the fiducial center pixel coordinate, and the feature point.

12. The non-transitory computer program of claim 8, wherein the fourth step comprises:
a step of iteratively moving a pixel coordinate little by little from the starting point (SP, SP') towards the target pixel coordinate (TP') in a Canvas plane of the CCTV video until the pixel coordinate reaches the target pixel coordinate (TP'), with obtaining Δdisplacement of GIS information (ΔGIS_displacement) in the map corresponding to a piecewise displacement of pixel coordinate by use of partial differential coefficients of pixel width and pixel height with respect to latitude and longitude, wherein the partial differential coefficients correspond to the location of the piecewise displacement in the Canvas plane, and then obtaining the GIS information (TP) of the target by totally reflecting the plurality of ΔGIS_displacement which are obtained in the iteration.

13. The non-transitory computer program of claim 12, wherein the obtaining of ΔGIS_displacement corresponding to the Δdisplacement of pixel coordinate is performed by $$\begin{pmatrix} \Delta lat \\ \Delta lon \end{pmatrix} = \begin{pmatrix} \frac{\partial W}{\partial lat} & \frac{\partial W}{\partial lon} \\ \frac{\partial H}{\partial lat} & \frac{\partial H}{\partial lon} \end{pmatrix}^{-1} \begin{pmatrix} \Delta W_{error} \\ \Delta H_{error} \end{pmatrix}$$

where the partial differential matrix corresponds to a rate of change in a pixel width (W) and a pixel height (H) with respect to latitude and longitude of the GIS information, ΔW_error and ΔH_error correspond to horizontal and vertical pixel errors between the target and a current position, and Δlatitude (Δlat) and Δlongitude (Δlon) correspond to Δdisplacement of GIS information (ΔGIS displacement) for reaching the target pixel coordinate (TP').

14. The non-transitory computer program of claim 8, wherein the fourth step comprises:
a step of iteratively moving the GIS information little by little from the starting point (SP, SP') with obtaining Δdisplacement of a pixel coordinate (Δpixel_displacement) corresponding to a piecewise displacement of GIS information by use of partial differential coefficients of pixel width and pixel height with respect to latitude and longitude until an accumulation of the plurality of Δpixel displacement reaches the target pixel coordinate (TP'), and then obtaining the GIS information (TP) of the target by totally reflecting the Δdisplacement of GIS information (ΔGIS_displacement) which are obtained in the iteration.

* * * * *